Aug. 21, 1928.  
E. L. LARSON  
1,681,486  
SPOTLIGHT CONTROL  
Filed June 29, 1927   2 Sheets-Sheet 1
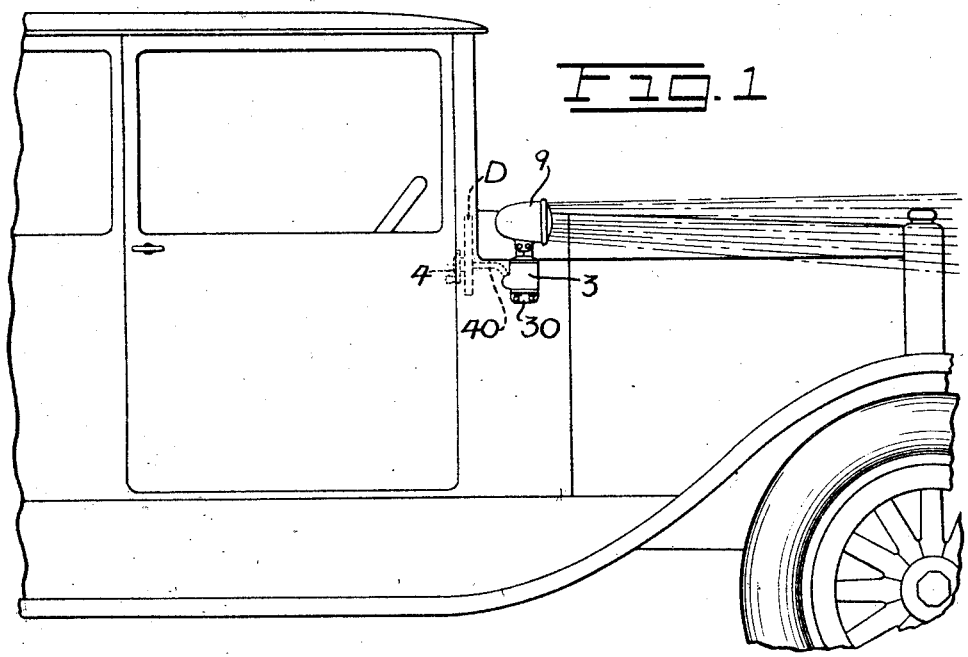
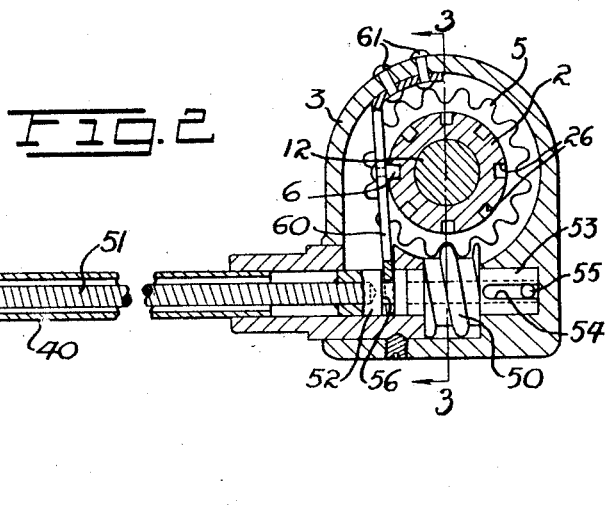
Inventor  
Elvin L. Larson  
By H.L. & C.L. Reynolds  
Attorneys Aug. 21, 1928.  E. L. LARSON  1,681,486
SPOTLIGHT CONTROL
Filed June 29, 1927   2 Sheets-Sheet 2
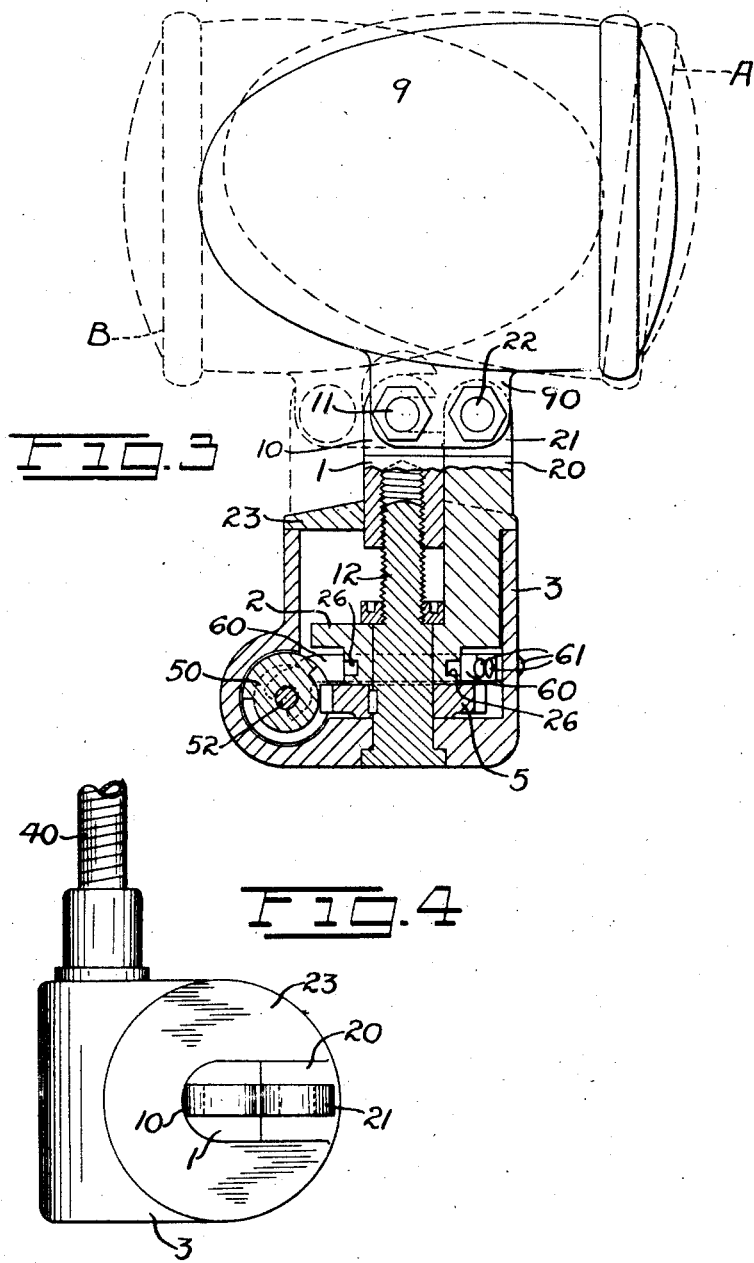
Inventor
Elvin L. Larson
By H. L. & C. L. Reynolds
Attorneys Patented Aug. 21, 1928.

1,681,486

UNITED STATES PATENT OFFICE.

ELVIN L. LARSON, OF ABERDEEN, WASHINGTON.

SPOTLIGHT CONTROL.

Application filed June 29, 1927. Serial No. 202,201.

My invention relates to an improvement in spot light controls, and is particularly intended as a means for controlling either the vertical or the horizontal adjustment of a spot light, or both, from a distant point.

Thus it is an object of my invention to provide a means for controlling a spot light from within a car so that its adjustment in a horizontal plane and in any vertical plane may be controlled by the driver from within the car, and at whatever point on the car the spot light may be located.

It is a further object to provide a control of the type described, by means of which the vertical and horizontal controls are effectuated by a single control member, and, preferably, by like movement of that control member in different positions of use.

A further object is the provision of a spot light control of the type described, comprising two laterally spaced pivotal supports for a spot light, and a common actuating means therefor, whereby one may be adjusted vertically relative to the other, and the second may be adjusted horizontally, swinging with the first to accomplish lateral or horizontal adjustment of the spot light.

A further object is the provision of such a spot light control, including a common actuating member for both vertical and horizontal adjustments, in which one, as the horizontal adjustment, is normally restrained, but having means whereby the restraint can be removed so that operation of the common actuating member will effect horizontal adjustment under such circumstances.

It is a further object to provide a simple and convenient device of the type described, and one which will be reliable in service and not liable easily to be broken or rendered inoperative.

My invention comprises the novel parts and the novel combination thereof, as shown in the accompanying drawings, described in the specification, and particularly defined by the claims terminating the same.

In the accompanying drawings, I have shown my invention in the form which is now preferred by me.

Figure 1 is a side elevation of the forward portion of an automobile, illustrating my device mounted thereon;

Figure 2 is a section through the actuating means for my device, taken on a horizontal plane;

Figure 3 is a section on line 3—3 of Figure 2, the spot light thus being shown in elevation; and Figure 4 is a plan view of the main actuating mechanism, the spot light being removed.

The problem of mounting a spot light on an automobile, particularly a closed car, and its proper control from within the car, is a serious one, and various solutions have been proposed, but in those of which I am aware, wherein it is proposed to control the spot light for vertical and horizontal movement, that is, substantially universally, it has been proposed, except as the spot light is mounted to project within the car, to provide separate control means for the vertical and for the horizontal adjustment, or to provide for adjustment horizontally by one type of movement, and for adjustment vertically by a different type of movement. According to my invention the spot light may be mounted at any point on the car, and a single control member is employed within the car, the movement of which in a rotary direction will effect either vertical or horizontal adjustment, the type of adjustment depending on the position of the control member relative to its support.

Thus, in Figure 1, I have illustrated the spot light 9 as supported through the medium of the supporting casing 3 and bracket 30 upon the right hand side of a closed automobile, the control of the spot light being secured through the medium of a control handle 4 placed upon the dash board D of the car within reach of the driver, or in any other convenient location, and communicating with the spot light actuating mechanism within the casing 3 by means of devices such as a flexible shaft within the flexible conduit or tube 40.

In Figure 3 the spot light, which, of itself forms no part of the present invention, is shown as provided with a bracket 90, with which is engaged two supporting members, one being the nut 1 and the other being a post 20 upstanding from a turnable member 2. Each of these is connected to the spot light, or to its bracket 90, by a pivotal support. The nut 1 is provided with an ear 10 through which a pivot pin or rivet 11 is passed, this passing also through the bracket 90, and the post 20 is provided with a similar ear 21, through which and through the bracket 90 passes a pivot bolt 22. The bracket is, in effect, supported on the pivot bolt 22 and its movement is controlled by the pivotal engagement of the bolt or rivet 11 therewith. It will be noted in this connection, as seen especially in Figure 4, that the nut 1 is non-circular in cross section, so that it may slide axially within a cap 23 which rotates with, and which may form a part of the post 20, but the bolt 11 may not rotate relative to this cap.

Axial movement of the nut 1 is obtained through a bolt 12 threading therein, which bolt passes through the turntable 2 which carries the post 20, but is not secured thereto. In other words, the bolt 12 may rotate, while the turntable 2 is held against rotation, but if the turntable 2 is not held against rotation its weight and its frictional engagement with the bolt 12, or with the gear 5 which forms a common actuating means for both the bolt and the turntable and which is secured to the bolt 12, will cause the turntable to rotate. Thus, while the turntable is restrained against rotation, rotation of the bolt 12 gear 5 will secure rotation of the bolt 12 to which it is secured, and this will produce movement of the bolt 1 in a vertical direction, causing adjustment of the spot light in a vertical plane, to such a position as is indicated by the dotted lines A in Figure 3. If, however, the turntable 2 is not held against rotation, rotation of the gear 5 will cause simultaneous rotation of the bolt 12 and turntable 2 with its post 20 about the axis of the bolt, and this will cause swinging or revolution of the spot light 9 in a horizontal plane, as, for example, to the position indicated by the dotted lines B in Figure 3. This will be true in whatever vertical position the light may be.

To restrain the turntable when it is desired so to do, so that vertical adjustment may be had, I have shown a dog 6 carried upon a resilient arm 60 secured at 61 in the casing 3 and normally held in engagement with recesses 26 of the turntable 2. So long as this dog is engaged in the recesses, the turntable may not turn, but upon withdrawal of the dog the turntable is free to rotate in the manner heretofore described.

The common actuating means for the spot light further includes a pinion 50 journaled in the casing 3 and in mesh with the gear 5. To rotate the pinion 50, I have provided a shaft 51, which, preferably, is flexible torsion shafting, secured at one end to the control member 4 and extending through the protective tube 40 to a connection with the pinion 50. As it is necessary, through the medium of this shaft 51, to secure rotative movement of the pinion to effectuate both vertical and horizontal adjustment, and to secure endwise movement to permit the horizontal movement through release of the dog 6, I have shown the shaft 51 as connected not directly to the pinion 50 but to a pin 52, which is slidably but non-rotatably connected to the pinion 50. To obtain this result the pinion may have a hub extension 53 at one end, which has a longitudinal slot 54 within which is received a cross pin 55 secured in the pin 52. Thus the pin 52 will rotate the pinion 50 in whatever position it may assume lengthwise of the pinion 50. The pin is likewise provided with a circumferential groove 56 and the end of the flexible arm 60 is received in this groove. Thus endwise movement of the pin 52, secured through endwise movement of the shaft 51 will withdraw the dog 6 from engagement with the sockets 26 and will permit rotation of the turntable 2 upon rotation of the control member 4. To assist in moving the control member 4 away from the dash D to obtain endwise movement of the shaft 51 and pin 52, I may provide a small knob 41 on the control member 4, whereby it may be engaged to draw it outward.

It will now be understood that when it is desired to swing the spot light in a vertical plane, the control member 4 is merely turned in one direction or the other, and, by reason of the dog 6 restraining the turntable 2 from movement, rotation of the bolt only is effectuated by the common actuating means 50 and 5, and this threading in the nut 1 swings the spot light in a vertical plane. If horizontal movement of the spot light is desired, the dog 6 is withdrawn from its socket by appropriate movement of the control member 4, whereupon rotation of the pinion 50 and gear 5 swings the turntable 2 and simultaneously the bolt 12, and the spot light is swung in a horizontal plane.

What I claim as my invention is:

1. In combination with a spot light, a universal dirigible control therefor comprising a pivot support for the spot light, a turntable carrying said pivot support, a rotative bolt on which said turntable is loosely mounted, means for locking said turntable against rotation, a nut having a pivotal engagement with the spot light offset laterally from said pivotal support, said bolt being received in said nut, means for releasing or engaging said turntable lock at will, and means for rotating said bolt alone, if the turntable is locked, or said nut and turntable together if the turntable is released.

2. In combination with a spot light, a pivot support therefor, a nut having a pivotal engagement with the spot light laterally offset from said pivotal support, a bolt forming a second support for said light, and threaded in said nut and operable to adjust the light in a vertical plane, means operable from a distant point for rotating said bolt, means operable from the same source to rotate both of said supports about a common axis to adjust the light in a horizontal plane, means normally inoperative to lock said latter means against rotation, and means operable from the same distant point to release said locking means.

3. In combination with a spot light, two laterally spaced supports pivotally connected thereto, means for moving one of said supports in a vertical direction relative to the other support to adjust the light in a vertical plane, means for simultaneously rotating both of said supports about a common vertical axis to adjust the light in a horizontal plane, means for positively locking one of said adjusting means to prevent its operation during operation of the other, and distant means for releasing said locking means at will and for operating either of said adjusting means.

4. In combination with a spot light, two laterally spaced supports pivotally connected thereto, means for moving one of said supports in a vertical direction relative to the other support to adjust the light in a vertical plane, means for rotating both of said supports about a common vertical axis to adjust the light in a horizontal plane, a common actuating member for said vertical and horizontal adjusting means, having a positive connection with one and a yielding connection with the other, means for restraining that adjusting member having the yielding connection to the common actuating member, and means for releasing said restraining member at will.

5. In combination with a spot light, two laterally spaced supports pivotally connected thereto, means including a bolt and a nut for moving one of said supports in a vertical direction relative to the other support, means including a turntable journaled on said bolt for rotating both of said supports about a common axis horizontally, means for restraining said turntable from rotation, means for rotating said bolt, and means controlled from said latter means for releasing said restraining means.

6. In combination with a spot light, two laterally spaced supports pivotally connected thereto, means including a bolt and a nut for moving one of said supports in a vertical direction relative to the other support, means including a turntable journaled on said bolt for rotating both of said supports about a common axis horizontally, means for restraining said turntable from rotation, a gear secured upon said bolt to rotate it, a pinion in mesh therewith, means operable from a distant point to rotate said pinion, and means controlled by said latter means for releasing said restraining means.

7. In combination with a spot light, two laterally spaced supports pivotally connected thereto, means including a bolt and a nut for moving one of said supports in a vertical direction relative to the other support, means including a turntable journaled on said bolt for rotating both of said supports about a common axis horizontally, means for restraining said turntable from rotation, means including a shaft rotatable to rotate said bolt, and means controlled by endwise movement of said shaft to release said restraining means.

8. In combination with a spot light, two laterally spaced supports pivotally connected thereto, means including a bolt and a nut for moving one of said supports in a vertical direction relative to the other support, means including a turntable journaled on said bolt for rotating both of said supports about a common axis horizontally, a restraining dog, said turntable having means normally engaged by said dog to restrain it from rotation, and means for rotating said bolt, said latter means being operable at will for releasing said restraining dog.

9. In combination with a spot light, two laterally spaced supports pivotally connected thereto, means including a bolt and a nut for moving one of said supports in a vertical direction relative to the other support, means including a turntable journaled on said bolt for rotating both of said supports about a common axis horizontally, a restraining dog, said turntable having means normally engaged by said dog to restrain it from rotation, means for adjusting said light including a shaft and a gear rotatable to rotate the bolt, a pin slidable in said gear and forming the operative connection between said shaft and gear, said pin being engageable with said dog to release it upon endwise movement of the pin, and distant means operable at will to rotate said shaft and to move it endwise to release said dog.

10. In combination with a spot light, two laterally spaced supports pivotally connected thereto, means for moving one of said supports in a vertical direction relative to the other support to adjust the light in a vertical plane, means for rotating the second support about the first horizontally to adjust the light horizontally, means for restraining said horizontally movable support against movement, a common rotative actuating member for both of said supports, a pin non-rotatively but slidably engaged therewith, operative connection between said pin and restraining means for releasing the latter upon endwise movement of the pin, a distant control member, and a shaft connecting said control member and pin for transmitting rotary or endwise movement at will to the pin.

Signed at Aberdeen, Grays Harbor Co., Washington, this 23 day of June 1927.

ELVIN L. LARSON.